United States Patent [19]

Walton

[11] Patent Number: 4,980,539
[45] Date of Patent: Dec. 25, 1990

[54] PORTABLE WARMER

[76] Inventor: Charles A. Walton, 19115 Overlook Rd., Los Gatos, Calif. 95030

[21] Appl. No.: 472,892

[22] Filed: Feb. 2, 1990

[51] Int. Cl.⁵ .................. F27D 11/02; H05B 3/02
[52] U.S. Cl. .................. 219/432; 219/10.55 E; 219/10.55 F; 219/386; 219/521
[58] Field of Search ............... 219/432, 436, 438, 521, 219/385, 386, 387, 10.55 E, 10.55 F

[56] References Cited

U.S. PATENT DOCUMENTS

| | | | |
|---|---|---|---|
| 812,609 | 2/1906 | Stevens | 219/436 |
| 2,236,238 | 2/1941 | Lacy | 219/436 |
| 3,728,517 | 4/1973 | Tilp | 219/436 |
| 3,813,517 | 5/1974 | McGruder | 219/438 |
| 3,931,494 | 1/1976 | Fisher | 219/386 |
| 3,978,233 | 8/1976 | Bolt | 219/387 |
| 4,095,090 | 6/1978 | Pianezza | 219/438 |
| 4,219,715 | 8/1980 | Mandle | 219/10.55 E |
| 4,442,343 | 4/1984 | Genuit | 219/386 |
| 4,801,782 | 1/1989 | Ineson | 219/438 |

Primary Examiner—Teresa J. Walberg
Attorney, Agent, or Firm—Thomas E. Schatzel

[57] ABSTRACT

A portable warming container having an electric heating element, a temperature sensor, a battery, a wire loop, and a control circuit. The wire loop is arranged to charge the battery through the control circuit, and the temperature sensor ultimately controls the current delivered to the heating element from the control circuit and battery.

9 Claims, 2 Drawing Sheets

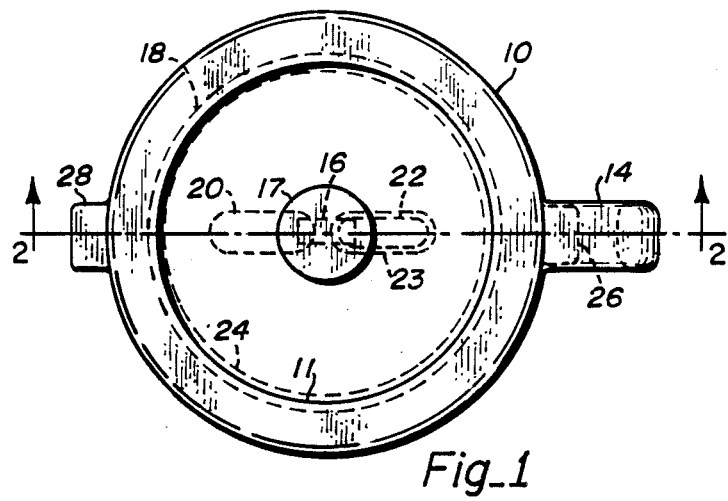
Fig_1
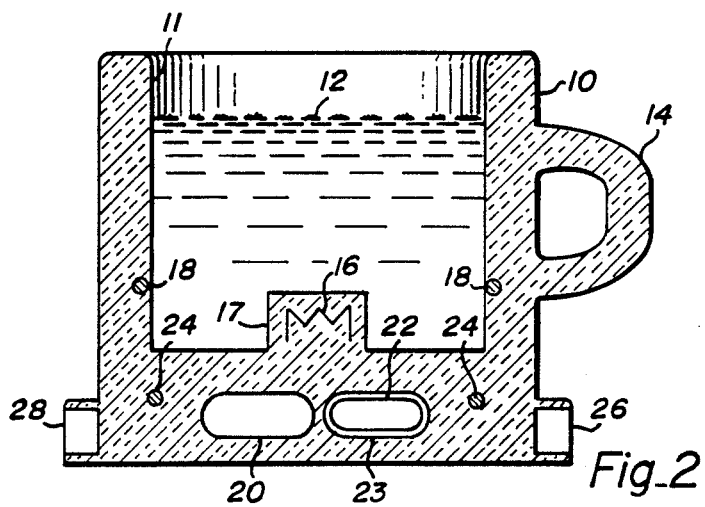
Fig_2
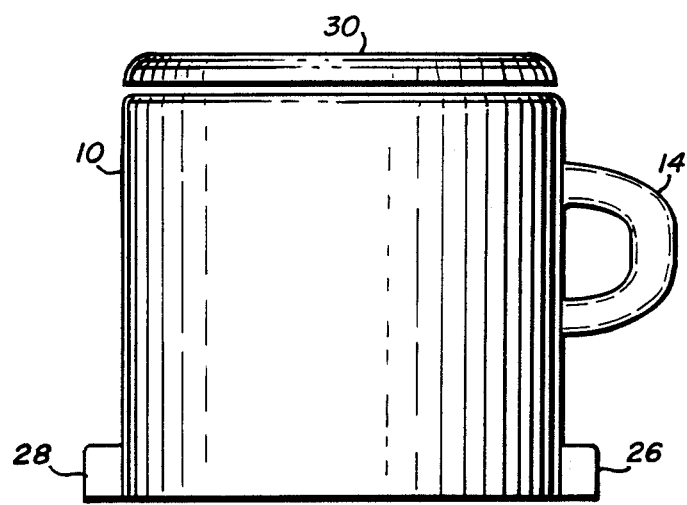
Fig_3

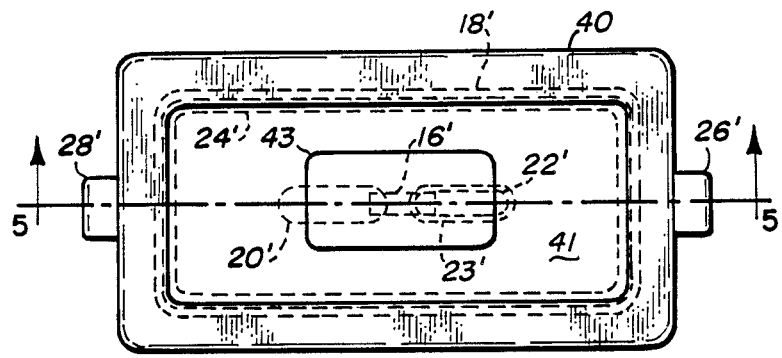
Fig._4
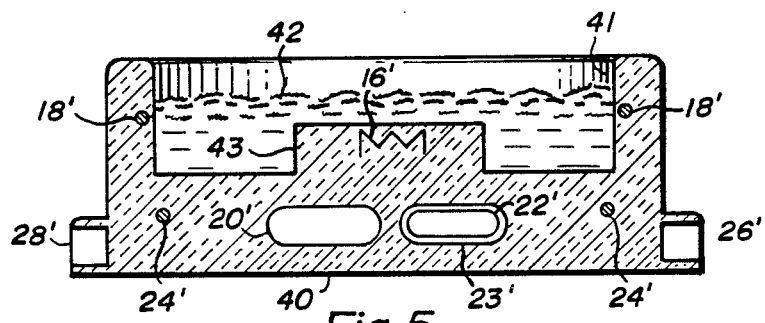
Fig._5
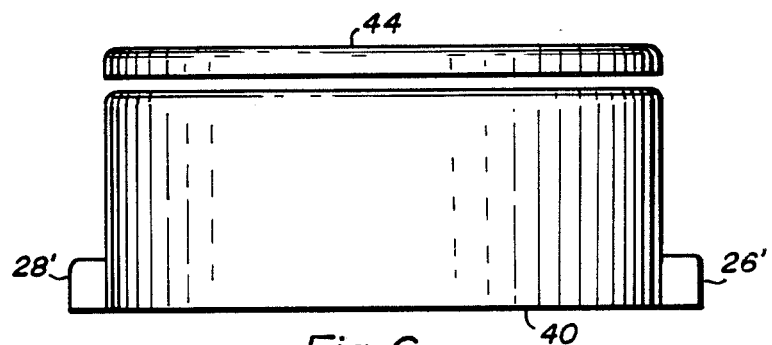
Fig._6
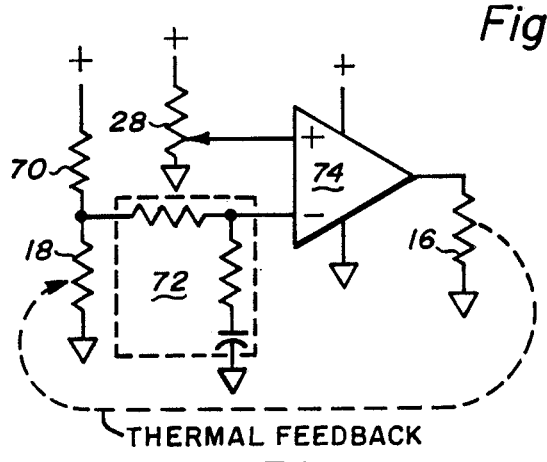
Fig._7A
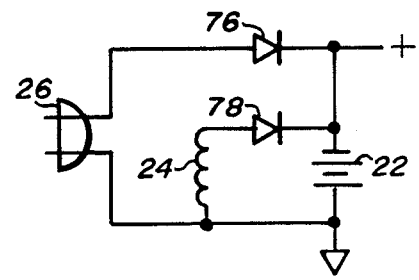
Fig._7B

PORTABLE WARMER

BACKGROUND OF THE INVENTION

1. Field of the Invention

The invention relates generally to portable containers and more particularly to portable containers wherein the serving temperature of the contents is maintained with a temperature-controlled integrated electric heating element and a battery.

2. Description of the Prior Art

Vacuum bottles and other highly insulated containers operate by slowing down the serving temperature heat loss of foods, beverages, or industrial chemicals. Specialized portable warmers and heaters that will maintain serving temperatures also exist that add heat derived from house current, natural gas, or other combustible fuels. Simple containers alternatively may be placed on hot-plates or other similar cooking devices that will maintain the heat of a container and its contents. Water-filled trays that are filled with hot water prior to serving also extend the time the food in them will remain hot.

The drawbacks of vacuum bottles and highly insulated containers are that they usually include a lid that must be placed back on the container after each use and they all experience a constant temperature decay that commences as soon as the container is initially closed. The temperature of the food and/or beverage contents inside the container start at an appropriate serving temperature, but cool-off considerably by the time the contents are consumed. Removing the lid each time the contents are sampled is also inconvenient.

Specialized portable warmers and heaters usually employ heat energy sources that require house wall current or open flame. These heat sources render these units not truly portable, but rather only transportable. They are also not intended for use as a cup to be raised to the mouth for sipping or use as an individual's dinner plate.

Water-filled trays are inconvenient due to the fact that the water in them must be added hot; the hot water may be initially too hot and thus warm the food and then cool-off to allow the food to become cooler than ideal serving temperature. In addition, the weight of the water added to a water-filled tray makes it heavy and awkward to use.

Simple containers can be placed on hot-plates, or other similar cooking devices, but the heat varies because the temperature of the food and/or beverage is not sensed, and the container must be returned to the heater each time it has been lifted away.

SUMMARY OF THE PRESENT INVENTION

It is therefore an object of the present invention to provide an improved container for foods, beverages, or industrial chemicals capable of constantly maintaining the temperature of its contents.

It is a further object to provide an improved container for foods, beverages, or industrial chemicals that senses the temperature of its contents and regulates an integrated heat source accordingly.

It is a further object to provide an improved container for foods, beverages, or industrial chemicals that is not bulky or awkward.

It is a further object to provide an improved container for foods, beverages, or industrial chemicals that may be placed on any table-top location usual to a cup and/or dinner plate without regard to a previous placement or energy source location.

It is a further object to provide an improved container for foods, beverages, or industrial chemicals that can recharge its batteries within the electromagnetic cooking field of a microwave oven.

Briefly, a preferred embodiment includes a container, in the shape and construction of a cup, having a heating element, battery, temperature sensor, wire loop, and control circuit. The temperature of the food and/or beverage contents of the container is detected by the temperature sensor which, in turn, causes the control circuit to regulate the flow of battery current delivered to the heating element placed at the bottom of the container and directly under the contents. A wire loop is embedded in the container and a means is included in the control circuit to rectify and charge the battery when electricity is induced into the wire loop by the electromagnetic field of a microwave oven.

A second preferred embodiment is similar to the first, but the container is fashioned in the shape and construction of a dinner plate.

An advantage of the present invention is that the contents of the container are maintained at a constant temperature.

Another advantage of the present invention is that the container may be returned to any table-top location usual to a simple cup or dinner plate.

Another advantage of the present invention is that the battery can be automatically recharged incidentally by routine cooking within a microwave oven.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a top elevational view of a beverage warmer in accordance with the present invention;

FIG. 2 is a cross-sectional view of the beverage warmer taken along the line 2—2 of FIG. 1;

FIG. 3 is a perspective view of the side of the beverage warmer in accordance with the present invention;

FIG. 4 is a top elevational view of a food warmer in accordance with the present invention;

FIG. 5 is a cross-sectional view of the food warmer taken along the line 5—5 of FIG. 4;

FIG. 6 is a perspective view of the side of the food warmer in accordance with the present invention.

FIG. 7A is a circuit diagram of a first portion of the control circuit shown in FIGS. 1, 2, 4, and 5.

FIG. 7B is a circuit diagram of a second portion of the control circuit shown in FIGS. 1, 2, 4, and 5.

DETAILED DESCRIPTION THE PREFERRED EMBODIMENT

Referring now to FIGS. 1-3. there is shown a hand-held portable container in the shape of a cup referred to by the general reference numeral 10 containing the invention. The container 10 forms a vat 11 for receiving a beverage 12. The container 10 has a handle 14. A heating element 16 is placed within a stub 17 located at the bottom of container 10 such that beverage 12 may be heated by it. A temperature sensor 18 is placed within the container 10 so as to detect the temperature of beverage 12 and is connected to a control circuit 20 and a battery 22 placed in a portal 23. A wire loop 24 is positioned within the container 10 and arranged to receive electricity by electromagntic induction and is connected to the control circuit 20. The battery 22 is also arranged to receive electricity from a power-plug 26. The temperature of beverage 12 can be varied by adjusting a variable control 28. A removable lid 30 fits over container 10 to keep in heat and moisture.

The lowering temperature of beverage 12 will be detected by temperature sensor 18 and which in turn connects to control circuit 20 that regulates current according to said temperature. The variable control 28 will change the set-point of the temperature that is maintained. Battery 22 within portal 23 supplies the current thus regulated and delivered to heating element 16, which in turn produces heat to increase the temperature of beverage 12. The temperature of the beverage is therefore stabilized. Wire loop 24 is constructed such that a voltage and current adequate for recharging the battery are induced in it by electromagnetic induction when placed in the usual field of cooking energy found in a microwave oven. Alternatively, the battery 22 can be recharged by electrical current from power-plug 26. Control circuit 20 conditions this current to become a charging current to recharge battery 22. The lid 30 keeps in heat and moisture and thereby reduces the required current draw on battery 22.

With the beverage container embodiment of FIGS. 1-3, cooling-off of beverages is substantially inhibited by adding a controlled amount of heat to maintain a fixed and/or adjustable temperature. The advantages become more apparent when used as a coffee or tea mug. Hot beverages such as these will not slowly cool-off as the cup sits on the table waiting for the contents to be drunk. The beverage container may be picked up and placed without regard to its special attributes just as if it were an ordinary simple cup. When placed in a microwave oven for cooking of the beverage, a portion of the induced electric current from the microwave's electromagnetic field is converted into a charging current for the embedded battery.

A second preferred embodiment, as depicted in FIGS. 4-6, is similar to that described above and heats foodstuffs. Those elements of FIGS. 4-6 similar to elements in FIGS. 1-3 carry the same reference numerals distinguished by prime designation. Referring now to FIGS. 4-6, there is shown a hand-held portable container in the shape of a dinner plate referred to by the general reference numeral 40 containing the invention. The container 40 forms a vat 41 for receiving a foodstuff 42. A heating element 16' is placed within a stub 43 located at the bottom of container 40 such that foodstuff 42 may be heated by it. A temperature sensor 18' is placed within the container 40 so as to detect the temperature of foodstuff 42 and is connected to a control circuit 20' and a battery 22' placed in a portal 23'. A wire loop 24' is positioned within the container 40 and arranged to receive electricity by electromagnetic induction and is connected to the control circuit 20'. The battery 22' is also arranged to receive electricity from a power-plug 26'. The temperature of beverage 12 can be varied by adjusting a variable control 28'. A removable lid 44 fits over container 10 to keep in heat and moisture.

The lowering temperature of foodstuff 42 will be detected by temperature sensor 18' and which in turn connects to control circuit 20' that regulates current according to said temperature. The variable control 28' will change the set-point of the temperature that is maintained. Battery 22' supplies the current thus regulated and delivered to heating element 16', which in turn produces heat to increase the temperature of the foodstuff 42. The temperature of the foodstuff 42 is therefore stabilized. Wire loop 24' is constructed such that a voltage and current adequate to recharge the battery are induced in it by electromagnetic induction when placed in the usual field of cooking energy found in a microwave oven. Alternatively, the battery 22' can be recharged by electrical current from power-plug 26'. Control circuit 20' conditions this current to become a charging current to recharge battery 22'. The lid 44 keeps in heat and moisture and thereby reduces the required current draw on battery 22'.

With the food container embodiments of FIGS. 4-6, cooling-off of foods is substantially inhibited by adding a controlled amount of heat to maintain a fixed or adjustable temperature. The advantages become more apparent when used as a dinner plate. Hot food entrees will not slowly cool-off as the plate sits on the table waiting for the meal to be eaten. The food container may be picked up and placed without regard to its special attributes just as if it were an ordinary simple dinner plate. When placed in a microwave oven for cooking of the food, a portion of the induced electric current from the microwave's electromagnetic field is converted into a charging current for the embedded battery.

FIG. 7A is a circuit diagram of the main part of the control circuit 20 and 20' shown in FIGS. 1, 2, 4, and 5. A resistor 70 and the temperature sensor 18 form a voltage divider. Temperature sensor 18 is a temperature-sensitive resistor which is positioned within container 10 or 40 in close thermal proximity to the contents of the container 10 or 40, as shown in FIGS. 1, 2, 4, and 5. A low-pass stabilizing network 72 filters the voltage to a first input of an operational amplifier 74 to prevent oscillation. The variable control 28 or 28' provides an adjustable set-point voltage to a second input of the operational amplifier 74. The output of the operational amplifier 74 drives the heating element 16. The heating element 16 or 16' is mounted in close thermal proximity to the contents of container 10 or 40 as shown in FIGS. 1, 2, 4, and 5. When the temperature of the contents of container 10 or 40 cools, the resistance of sensor 18 or 18' drops, the voltage at the negative input of operational amplifier 74 drops, and the operational amplifier 74 output rises. Given this condition, the operational amplifier 74 will output a current to heating element 16 or 16'. The heat from heating element 16 or 16' will raise the temperature of the contents of container 10 or 40, which temperature rise, in turn, will be sensed by temperature sensor 18 or 18'. A sufficient rise in the temperature sensed by temperature sensor 18 or 18' will cause the voltage at the negative input of the operational amplifier 74 to rise above the setpoint voltage at the positive input of operational amplifier 74. This will result in the output being reduced to heating element 16 or 16'. A closed loop control circuit is therefore established.

The power circuitry of control circuit 20 or 20' is shown in the circuit diagram in FIG. 7B. An external power input to power plug 26 or 26' is passed through a diode 76 to charge battery 22 or 22'. When wire loop 24 or 24' is exposed to an intense electromagnetic field, such as found in a microwave oven, an AC current will be induced in wire loop 24 or 24'. The AC current is rectified by a diode 78 and the resulting DC current charges battery 22 or 22'.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A portable container comprising, in combination:
   a hand-held portable container open at the top forming a vat for holding a supply of food, beverage or industrial chemicals;
   an electric heating element within the container
   a means within the container for receiving a battery;
   a control circuit enclosed within the container and with means for connecting to said battery and for regulating electric current to the electric heating element;
   a temperature sensing element within the container and positioned adjacent to said vat, the temperature sensing element being connected to the control circuit whereby the control circuit may adjust the electric current according to the temperature of foods, beverages or industrial chemicals placed within the vat of the container;
   whereby the temperature of foods, beverages, or industrial chemicals are maintained at their serving/optimum temperatures after cooking; and
   capturing means within the container for capturing electromagnetic radiation energy present during cooking in a microwave oven whereby the battery can be recharged from the resulting induced electrical current.

2. The portable container of claim 1 further including a means for replacing the battery whereby the battery may be exchanged with a fresh battery.

3. The portable container of claim 1 further including a means for adjusting the control circuit whereby various selected temperatures may be maintained.

4. The portable container of claim 1 further including a means for recharging the battery whereby an electrical power input is plugged into the container.

5. The portable container of claim 1 further including a lid to cover the top opening of the container whereby heat and/or vapor loss is reduced.

6. The portable container of claim 1 further including a raised portion of the bottom of the container that contains the heating element whereby heat is more efficiently delivered to the contents of the container.

7. The portable container of claim 1 further including container shapes and materials, and temperature setpoints whereby the portable container is suitable for use with hot beverages, hot foods, or industrial chemicals, such as hot glue.

8. The portable container of claim 1 wherein
   said hand-held portable container is formed in the shape of a coffee cup with a handle and constructed of molded porcelain or plastic.

9. The portable container of claim 1 further including
   a positioning of the heating element within a raised stub section of the bottom of the hand-held portable container;
   said temperature sensing element is comprised of a temperature sensitive resistor;
   said control circuit is comprised of a first and a second voltage divider, said first voltage divider having a temperature sensitive resistor element and said second voltage divider having a variable potentiometer, an operational amplifier which receives voltages from said first and second voltage dividers, a low-pass filter whereby oscillations are inhibited, said heating element comprised of a resistor and connected to the output of said operational amplifier, a rectifying diode whereby the current induced in said capturing means is conditioned to charge said battery, and a rectifying diode connected between a power input plug and said battery.

* * * * *